United States Patent [19]

Fujimoto et al.

[11] Patent Number: 4,680,623
[45] Date of Patent: Jul. 14, 1987

[54] SOLID STATE COLOR IMAGING APPARATUS PRODUCING CHROMINANCE AND LUMINANCE SIGNALS FROM UNSATURATED ORES OF N COLOR SIGNALS

[75] Inventors: Makoto Fujimoto, Ibaraki; Yoshinori Kitamura, Takatsuki; Atsushi Morimura, Nara; Hiroki Matsuoka, Takatsuki, all of Japan

[73] Assignee: Matsushita Electric Industrial Co., Ltd., Kadoma, Japan

[21] Appl. No.: 700,382

[22] Filed: Feb. 11, 1985

[30] Foreign Application Priority Data

Feb. 15, 1984 [JP] Japan ................................. 59-26324

[51] Int. Cl.$^4$ .......................... H04N 9/077; H04N 9/04
[52] U.S. Cl. ........................................ 358/44; 358/41
[58] Field of Search ................. 358/29, 29 C, 41, 43, 358/44, 50

[56] References Cited

U.S. PATENT DOCUMENTS 3,647,943 3/1972 Marshall ................................. 358/47
4,504,854 3/1985 Masuda ................................. 358/44

FOREIGN PATENT DOCUMENTS 34630 3/1977 Japan ................................. 358/44
8699 3/1978 Japan .
26979 2/1982 Japan ................................. 358/44

Primary Examiner—James J. Groody
Assistant Examiner—Randall S. Svihla
Attorney, Agent, or Firm—Cushman, Darby & Cushman

[57] ABSTRACT

In a color imaging apparatus having a single chip solid state state sensor and an n color filter matrix, n color signals are used by an operation circuit in a first signal processing mode to generate chrominance signals and a luminance signal. When one of the n color signals reaches a saturation level, the operation circuit utilizes the remaining n-1 color signals. When a second color signal reaches the saturation level, a compensation signal is generated from a particular non-saturated color signal and the operation circuit utilizes the remaining n-2 non-saturated signals, including the particular non-saturated signal, and the compensation signal to produce the chrominance signals and the luminance signal. Compensation signals are generated from the particular signal until the particular color signal saturates. The particular color signal saturates last.

4 Claims, 8 Drawing Figures

Horizontal direction →

SOLID STATE COLOR IMAGING APPARATUS PRODUCING CHROMINANCE AND LUMINANCE SIGNALS FROM UNSATURATED ORES OF N COLOR SIGNALS

BACKGROUND OF THE INVENTION

1. Field of the Invention

The present invention relates generally to a solid state color imaging apparatus for use, for instance, in a video camera, and particularly concerns an improvement in a solid state color imaging apparatus having a plurality of color filter elements combined with solid state imaging sensors and a processing circuit for processing output signals from the solid state imaging sensors.

2. Description of the Prior Art

In a video camera, important characteristics are resolution, sensitivity and dynamic range. Hitherto, many efforts and proposals have been made to improve these characteristics. This is true of course of a video camera utilizing a solid state color imaging sensor in which photodiodes or the like are disposed in two-dimensions. This invention particularly relates to a solid state color imaging apparatus intended to achiever higher dynamic range and higher sensitivity in comparison with conventional solid state color imaging apparatus. Characteristics of improved dynamic range and sensitivity in a solid state imaging apparatus are created using a color video camera having a monolithic solid state imaging sensor, as one example.

The dynamic range of the monolithic color camera is determined by the image sensing characteristic and method of color separation. The dynamic range or S/N characteristic of the solid state imaging sensor is as follows. When there is no incident light to the solid state imaging sensor (hereinafter referred to as dark noise) is determined mainly by the noise of the output amplifier of the imaging sensor and the dark current value, and on the other hand, the noise when there is certain incident light to the imaging sensor is determined by the nonuniformity in sensitivity of the imaging sensor and by the shot noise of the imaging sensor.

Since the solid state imaging sensor is a kind of IC, miniaturization of size is desirable for the sake of higher manufacturing yield. Besides, in order to pursue higher camera resolution, high integration is required. As a result of the decrease of size and the higher integration, the above mentioned dark noise and the S/N characteristic which is determined by saturation noise become worse as a general rule. This is found in the shot noise, for example. Saturation signal intensity of a generally utilized solid state imaging sensor is about $2\times10^5-10^6 e$, and shot noise intensity at that time is about $300-10^3 e$, and the S/N ratio is about 53–60 dB. When the degree of integration increases, for instance, as area of CCD decreases, the intensity of saturation signal becomes low. Provided that the saturation signal intensity is $5\times10^4 e$, the shot noise becomes $2\times10^2 e$, and the S/N ration decreases to 47 dB. That is, the video camera utilizing the solid state imaging sensor should have an image output with a better S/N ratio of the image sensor.

On the other hand, the high integration necessarily decreases the areas of the imaging sensor elements, and this obviously decreases efficiency of the photoelectric transducing, hence sensitivity. Accordingly it is necessary to intend to improve efficiency of the photoelectric transducing by utilization of higher transmittance in the color separation. As to filters which meet the above-mentioned purpose, use of complementary type color filters is known. FIG. 1 shows one known example of color filter arrangement in a single chip color imaging camera using white (W), yellow (Ye), cyan (Cy) and green (G) as the complementary type color filters. This system reads out photoelectrically transduced signals w and g through the color filters W and G in a first horizontal scanning, and reads out photoelectrically transduced signals y and cy through the filters Ye and Cy in a second horizontal scanning. These read-out signals w, g, y, and cy are directly passed through low pass filters to produce a luminance signal Y. On the other hand, computation of $(w-g)+(y-cy)$ and $(w-g)-(y-cy)$ are carried out, and thereby principal color signals R and B are separated, and together with the above-mentioned luminance signal a known composite color signal is produced.

The above mentioned conventional color separation method is defective in that it has a narrow dynamic range. This is caused by differences between transmittances of different color filters. FIG. 2 shows image sensoring characteristic and results of operations of $(w-g)$, $(y-cy)$ and $(w-g)+(y-cy)$. As is obvious from the curves of FIG. 2, $(w-g)+(y-cy)$ is proportional to incident light intensity until the saturation point of w, but the curve sharply goes down after the saturation of w. That is, the above-mentioned systems of W, Ye, Cy, and G filters has only a limited usable range until the saturation point of w. At that time, other signals y, cy and g do not saturate. Therefore, the luminance signal Y at the saturation point becomes as follows:

$$Y=w+g=y+cy=R+2G+B \qquad (1),$$

wherein R, G and B are signals of principal color light.

Now provided that $R=G=B=1$, the luminance signal Y can be represented as $$Y=4=(4/3)w \qquad (2).$$

That is, the luminance signal at the saturation point in the above-mentioned conventional system becomes $(4/3)\cdot\frac{1}{2}=\frac{2}{3}$ of a value $Y=w+w=2w$ which is the luminance signal when no color filters are used. In other words, in the conventional W, Ye, Cy and G filter system, the dynamic range is limited to $\frac{2}{3}$ of the case when no color filters are inserted.

This is contrary to the need for a color separation system which is usable in a narrower dynamic range for the above-mentioned solid state imaging sensor.

In summary, a color separation method usable for a narrower dynamic range image sensor utilizing color filters of high transmittances is need for a color camera using the solid state imaging sensor. However, the conventional system is not advantageous in dynamic range for the high transmittance filters.

SUMMARY OF THE INVENTION

The purpose of the present invention is to provide an improved solid state imaging apparatus capable of extending its dynamic range until the saturation point of the color signal which saturates last.

This solid state color imaging apparatus in accordance with the present invention comprises first means for detecting photoelectrically transduced signal levels of picture elements, and for applying different color separation methods to the output signals responding to the detected signal levels, and second means to compensate the signal for the picture elements above a saturation point with predicted values computed from signals of not-yet-saturated picture elements.

The solid state color imaging apparatus in accordance with the present invention comprises:

n color filters disposed in predetermined disposition, a solid state imaging sensor for receiving light of an image through the color filters thereby producing n-kinds of color signals, operation means for receiving the n-kinds of color signals from the solid state imaging sensor and producing therefrom color or chrominance signals and a luminance signal in a first manner such that the chrominance signals and the luminance signal are made by using all of the n-kinds of the color signals or in a second manner that the chrominance signals and the luminance signal are made by using (n−1)-kinds of color signals, and control means for switching the mode of operation of the operation means responding to levels of input signals to the operation means.

Furthermore, the solid state color imaging apparatus in accordance with the present invention comprises:

solid state imaging sensor for receiving light of an image through the color filters thereby producing n-kinds of color signals, operation means which receives the n-kind of different color signals from the solid state imaging sensor and produces a compensated signal, by adjusting a first color signal to produce a compensated signal the compensated signal or the second color signal being selectable, and operating upon either one of the compensated signal or the second color signal together with the first and remaining color signals the to produce chrominance signals or a luminance signal.

DETAILED DESCRIPTION OF THE INVENTION

A preferred embodiment of the present invention is explained with reference to FIG. 3 which shows one example of the disposition of the color filter elements for a solid state imaging apparatus for a monolithic image sensor type.

Figure 1:
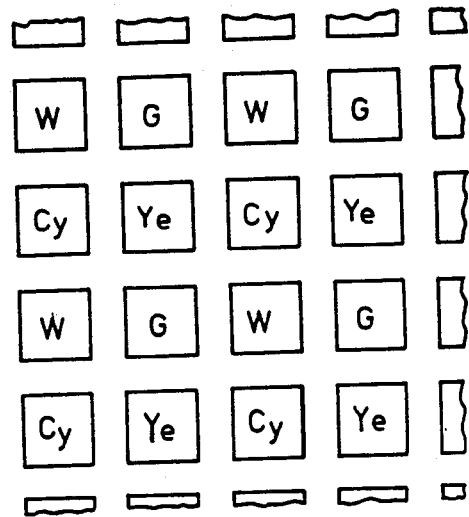
FIG. 1 is the front view schematically showing the disposition of color filter elements of the conventional solid state color imaging apparatus.
Figure 2:
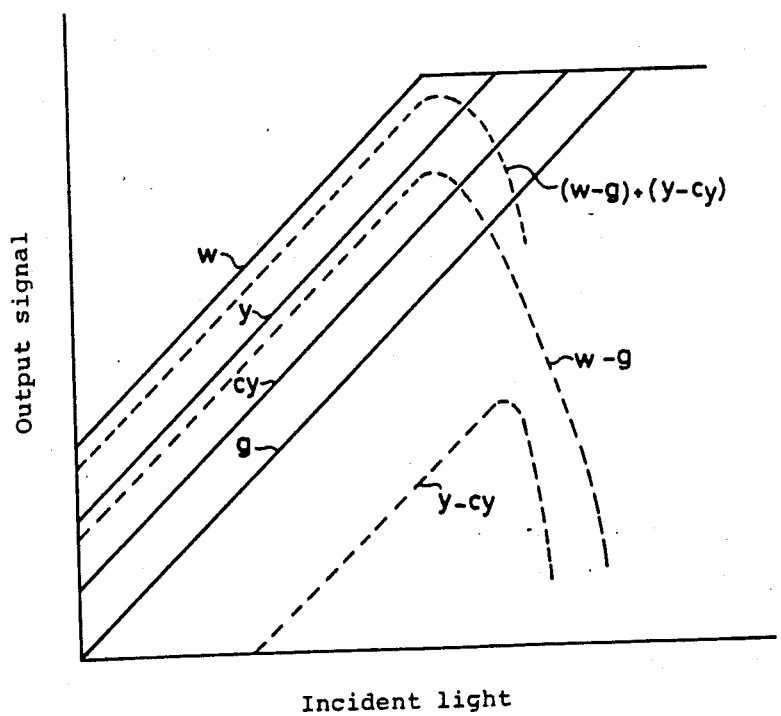
FIG. 2 is the graph showing curves of incident light intensity vs signal intensity of the conventional solid state color imaging apparatus having the color filter shown in FIG. 1.
Figure 3:
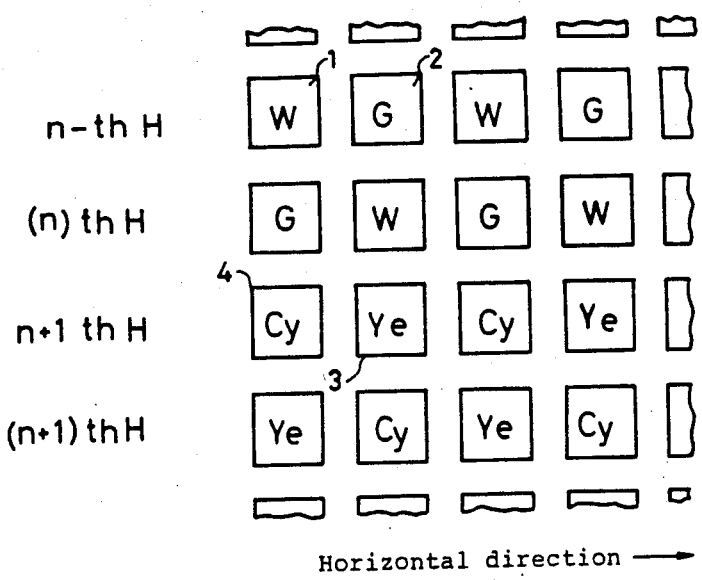
FIG. 3 is a front view schematically showing disposition of color filter elements of a preferred embodiment of the present invention.

The color filter shown in FIG. 3 has a number of horizontal lines of color filter elements. In the color filter, the n-th picture element line has first filters (W) 1 and second filters (G) 2 which pass green light in alternately repeated order, and (n+1)th picture element line has third filters (Ye) 3 which stop blue light and fourth filters (Cy) 4 which stop red light in alternately repeated order, and the disposition of the above-mentioned color filter elements are interleaved in horizontal direction for a first field and a second field. In FIG. 3, parentheses in the left part of the lines show the lines in the second field. The above-mentioned interleaving is made for the purpose of increasing the sampling number of the objective image by the picture elements in the horizontal direction, thereby improving resolution.

Figure 4:
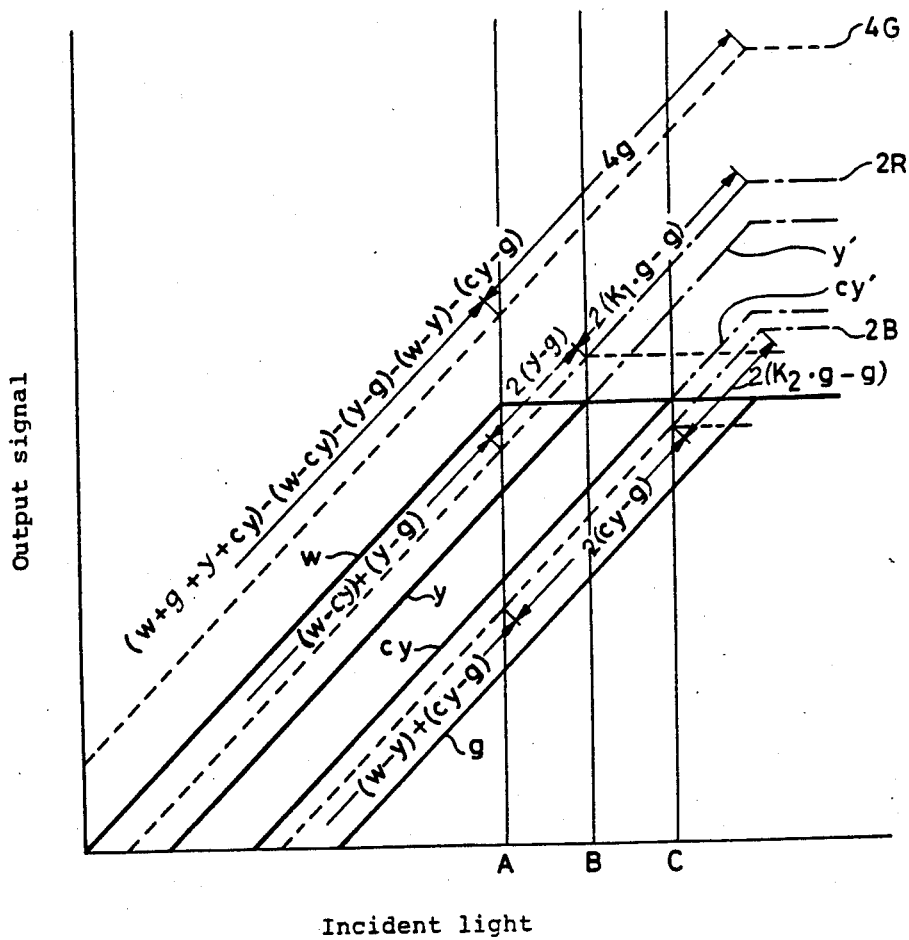
FIG. 4 is a graph showing characteristic curves of incident light intensity vs output signals for explanation of the signal processing of the present invention.

Imaging characteristics of the solid state imaging sensor with color filters disposed as in FIG. 3 is shown in FIG. 4. Separation of primary color lights are made as follows:

$$\left. \begin{array}{l} R = (w - cy + y - g)/2 \\ B = (w - y + cy - g)/2 \\ G = (w + g + y + cy - 2R - 2B)/4 \end{array} \right\} . \quad (3)$$

In FIG. 4, actual values of primary color lights R, G, and B are represented by respective dotted lines. In the separation of lights, the w signal based on the light passing through W filters having the highest transmittance reaches a saturation point A in FIG. 4 first.

Then, the operation of color separation is changed into the following system:

$R = y - g$ $B = cy - g$ \hfill (4).

$G = g$

That is, after saturation of w signal, the color separation operation is carried out by omitting the w signal.

Next, the y signal reaches a saturation point at B in FIG. 4. In order to make color separation, at least three signals produced from lights obtained through three different kinds of filters are necessary. Therefore, after passing B point of incident light intensity, no changing of the color separation mode can be made. Therefore, a compensation method elucidated with reference to FIG. 5 is carried out.

Figure 5:
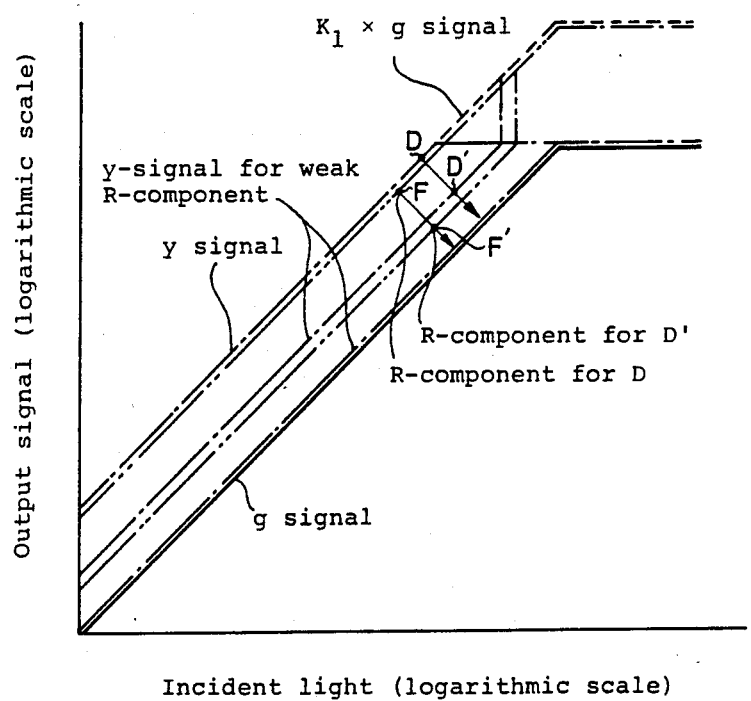
FIG. 5 is another graph showing characteristic curves of incident light intensity vs output signals for explanation of the signal processing of the present invention.

FIG. 5 shows the compensation method of the y signal and g signal. The dotted line shows the $K_1 \times g$ signal produced in order to extrapolate the y signal by making the level of the g signal to the level of y signal. As is obvious from the curves of FIG. 5, at least the y signal characteristic for w incident light can be replaced by the $K_1 \times g$ signal. Actually, when the value of y signal above its saturation point is replaced by the $K_1 \times g$ signal, the y signal compensated by the spectral characteristic of the object changes its characteristic as D→D'→ as shown by one-dotted chain line. As a result, the resultant R signal makes change as F→F'→ as shown by two-dotted chain lines in FIG. 5. But an ideal compensation is made when the image input is white. besides, though the values of F' have a large deviation induced by the change in actual operation, when the $\gamma$ characteristic is considered, its error decreases and actually there is no problem. Rather, it is more problematic that a white high luminance part has a liability of reproduced in some color, but this problem can be ideally compensated. Therefore, by compensating the y signal at the part above saturation point by utilizing the $K_1 \times g$ signal, the y signal can be apparently extended to the saturation point of g signal for actual use. R signal after the point B of FIG. 4 is produced in this manner. With regard to the B signal, since the cy signal saturates at C point, the cy signal can be replaced by $K_2 \times g$ signal and treated similarly to the case of R signal. Here, $K_2$ is a constant to make the level of g signal at white incident light to the same level as that of cy signal. In this manner, the cy signal can be extended to the saturation point of the g signal. In the above-mentioned way, all primary color signals can be actually extended to the saturation level of g signal which is last to saturate.

Figure 6:
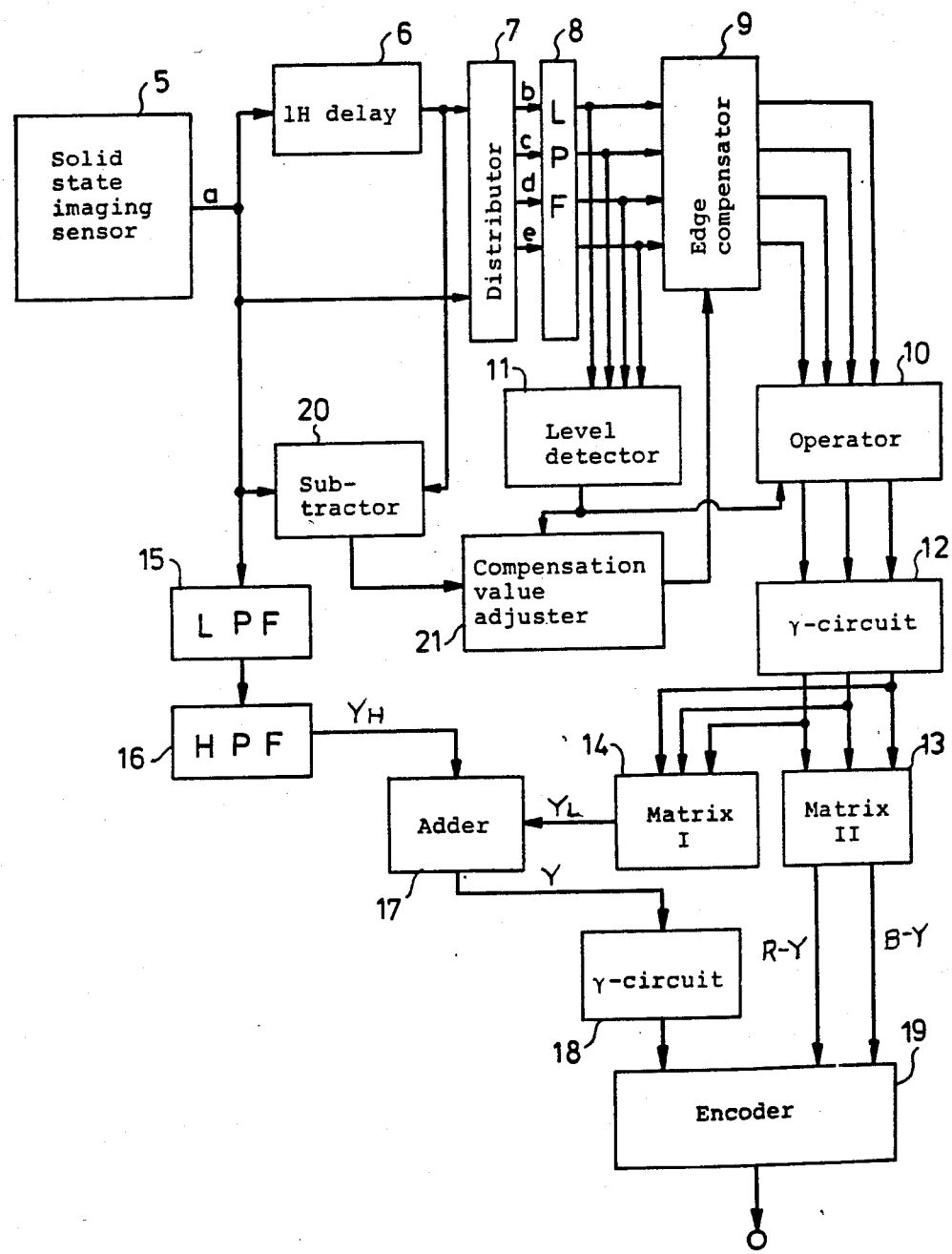
FIG. 6 is a block diagram showing a preferred embodiment of a color solid state imaging apparatus embodying the present invention.
Figure 7:
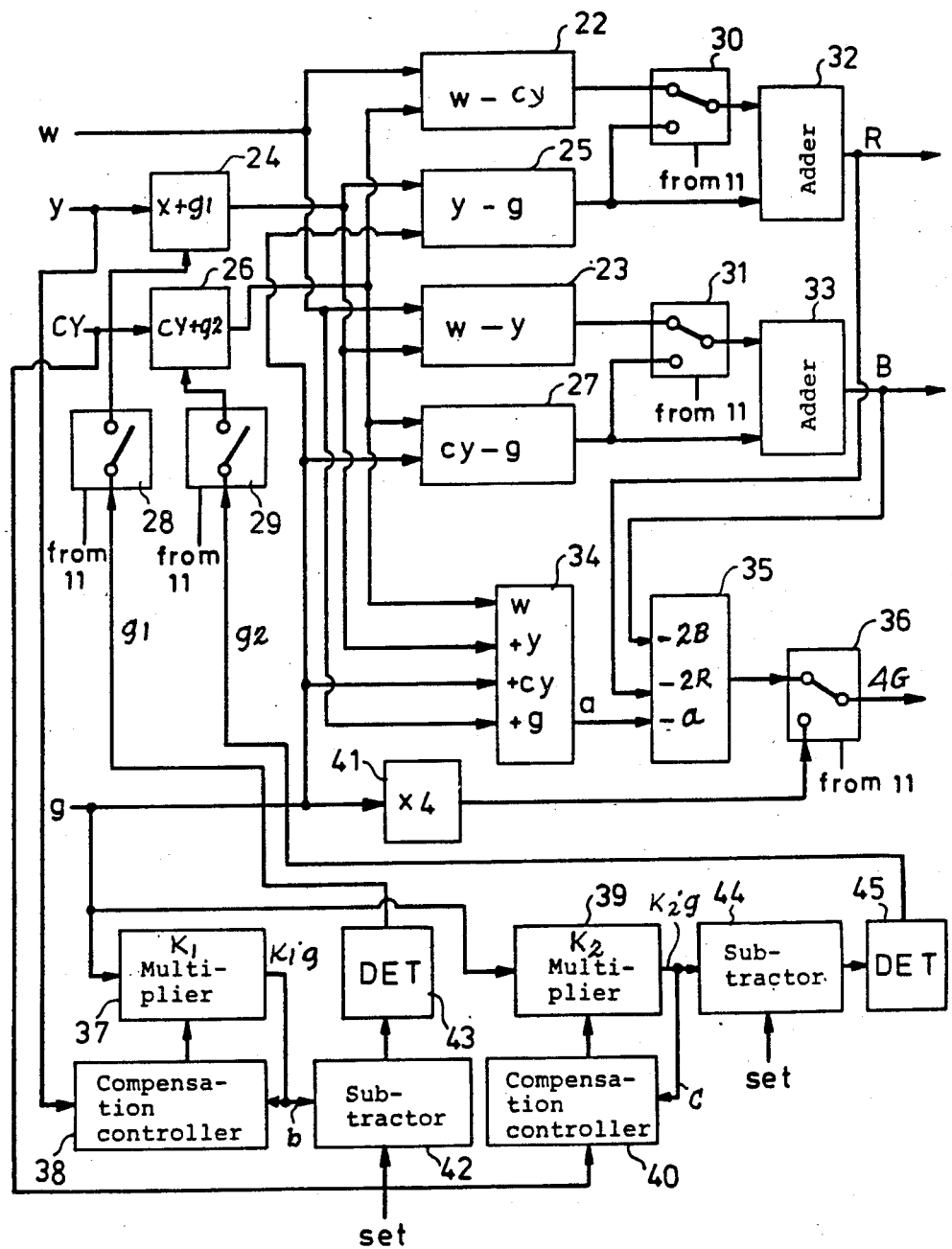
FIG. 7 is a more detailed block diagram of the operation circuit 10 of FIG. 6.

The above-mentioned operation is carried out in the circuit shown by block diagrams of FIG. 6 and FIG. 7.

In FIG. 6, a solid state imaging sensor 5 comprises the color filter shown in FIG. 3. As a result, at the output terminal "a", in the n-th horizontal scanning, signals w and g are issued; and in the (n+1)-th horizontal scanning, signals cy and y are issued. The signals at the output terminal "a" are given through a 1H delay circuit 6 to a distributor 7. As a result of all horizontal scannings, the input end of the distributor 7 receives signals w, g, y and cy. The distributor 7 distributes these signals to its output ports b, c, d, and e in a predetermined synchronization with horizontal scanning and vertical scanning. The output signals at the output end b, c, d, and e are after filtration by a low pass filter 8, given to an edge compensator 9. This edge compensator compensates undesirable mixing of difference of luminance signal in vertical direction into the separated color signals by utilizing vertical variation of luminance. This kind of circuit is similar to those used, for instance, in single carrier frequency multiplexing system with single tube. The compensated signal from the edge compensator 9 is then given to an "operator 10". The "operator 10" is a circuit for separating principal color signals R, G, and B from the output signals w, g, y, and cy, and the manner of its operation is controlled depending upon the levels of the input signals in the above-mentioned manner. By a control signal from a control circuit constituted by a level detector 11, on the other hand, output signals of the low pass filter 8 are given to a level detector 11 which detects the signals w, y, cy and g have reached their saturation points, and gives saturation detection signals to the operator 10. The operator 10 switches the mode of operation corresponding to the level detection signal from the level detector 11, and thereby extends the saturation points of respective primary color signals to the saturation point of g signal. Respective primary color signals R, G, and B issued from the operator 10 are, after γ compensation made in a γ circuit 12, given to a matrix-II 13 to produce color difference signals R−Y and B−Y. On the other hand, the above-mentioned primary color signals R, G and B are given to another matrix-I 14 to produce the low frequency part $Y_L$ of the luminance signal Y. That is, the matrix-I 14 is a circuit to make a processing, for instance, 0.30R+0.59G+0.11B. On the other hand, the output signal of the solid state imaging sensor 5 is given to a low pass filter 15 to limit to a luminance band width and a high pass filter 16 to produce high frequency part $Y_H$ of the luminance signal Y. The output from the high pass filter 16 is added at an adder 17 with low frequency component of luminance signal from matrix-I 14, and the resultant added signal of the adder 17 is through a γ circuit 18 given to an encoder 19 whereto output two color difference signals from the matrix II 13 are combined to produce a composite color signal.

The reason that two γ circuits 12 and 18 are provided is that, a larger γ-compensation is carried out for the low frequency part of the luminance signal, and the high frequency part of the color signals and luminance signals are subject to smaller γ-compensation, so as to achieve ideal S/N improvement.

A subtractor 20 is for detecting vertical edge intensity of the luminance signal, and this output is limited in the same frequency band as that of the low pass filter 8. The output of the subtractor 20 is, through a compensation value adjuster 21, given to the edge compensator 9 to control the latter. The compensation value adjuster 21 is for compensating the aforementioned vertical edge signal intensity at a part above the saturation point, since the vertical edge signal intensities vary as a result of saturations of the respective signals w, y, cy and g.

Details of operator 10 is explained with reference to FIG. 7, which shows one preferred embodiment of the operator 10. Input signal w is given to subtractors 22 and 23. The input signal y is, through an adder 24, given to the subtractor 23 and another subtractor 25. The input signal cy is, through an adder 26, given to the subtractor 22 and another subtractor 27. The input g signal is given to the subtractors 25 and 27.

When all input signals are under the saturation points, switch circuits 28 and 29 are open in compliance with the control signal, and therefore, the outputs of the subtractors 22, 25, 23 and 27 become w−cy, y−g, w−y and cy−g, respectively. Switch circuits 30 and 31 are connected to output ends of the subtractors 22 and 23, respectively, and therefore output of the adder 32 becomes $w-cy+y-g=2R$, and the output of the adder 33 becomes $w-y+cy-g=2B$. On the other hand, inputs of the adder 34 are w, y, cy, and g, and output of the adder 34 $a=w+y+cy+g$ is given to a subtractor 35 together with the outputs from the adders 32 and 33. As a result, the output of the subtractor 35 become $w+y+cy+g-2B-2R=4G$. Switch 36 is kept closed until the saturation point of the w signal to the subtractor 35, and therefore at the output end of the switch circuit 36 the above-mentioned output 4G is issued. Now, this state is defined as a first processing connection. On the other hand, input g signal is multiplied by the aforementioned $K_1$ time by a multiplier 37, and the multiplier 37 is controlled by an output from a compensation controller 38 to select the multiplication constant $K_1$ so as to make the output level of the multiplied g signal to the level of the y signal. A multiplier 39 and a compensation controller 40 are for multiplying the g signal by $K_2$ to the same level as the level of the cy signal. These circuit blocks 37, 38, 39 and 40 operate only when white object is received and these circuits issue at b point and c point, $K_1 \times g$ signal and $K_2 \times g$ signal, respectively only when white objective image was received.

When the w signal reaches a saturation point, the switch cicuits 30, 31 and 36 turn to subtractors 25, 27 and the multiplier 41, respectively. As a result, the output of the adder 32 becomes $(y-g)+(y-g)=2R$. And the output of the adder 33 becomes $(cy-g)+(cy-g)=2B$. And the multiplier 41 issues 4G as output. This state is defined as a second processing connection.

As a result of switching from the first processing connection to the second processing connection, respective chrominance signals and luminance signal have extended dynamic range by extending upwards beyond the saturation point of w signal. Then, when the y signal reaches a saturation point, the switch circuit 28 is closed in compliance with the control signal. Since the switch circuit 28 is impressed with a signal of a "b" point above the saturation point detected by a detector 43 valve of which is subtracted by a subtractor 42 from the signal of the "b" point. Accordingly, after saturation of the y signal, output of the adder 24 is added with y signal replaced by the multiplied g signal, $g_1$, and the operation range is extended to the saturation point of the g signal. Similarly, after saturation of the cy signal, the switch 29 is closed, and the replacing $g_2$ signal as compensation signal of the cy signal processed by a subtractor 44 and detector 45 is added to the adder 26, and accordingly the dynamic range of the cy signal is extended to the saturation point of the g signal.

As has been described, all the primary color signals are apparently extended to the saturation point of the g signal.

In the above mentioned embodiment of FIG. 6, the outout signals of the operator 10 is the primary color signals R, G, and B. But the invention is not limited to such an embodiment, and modifications can be made.

Figure 6A:
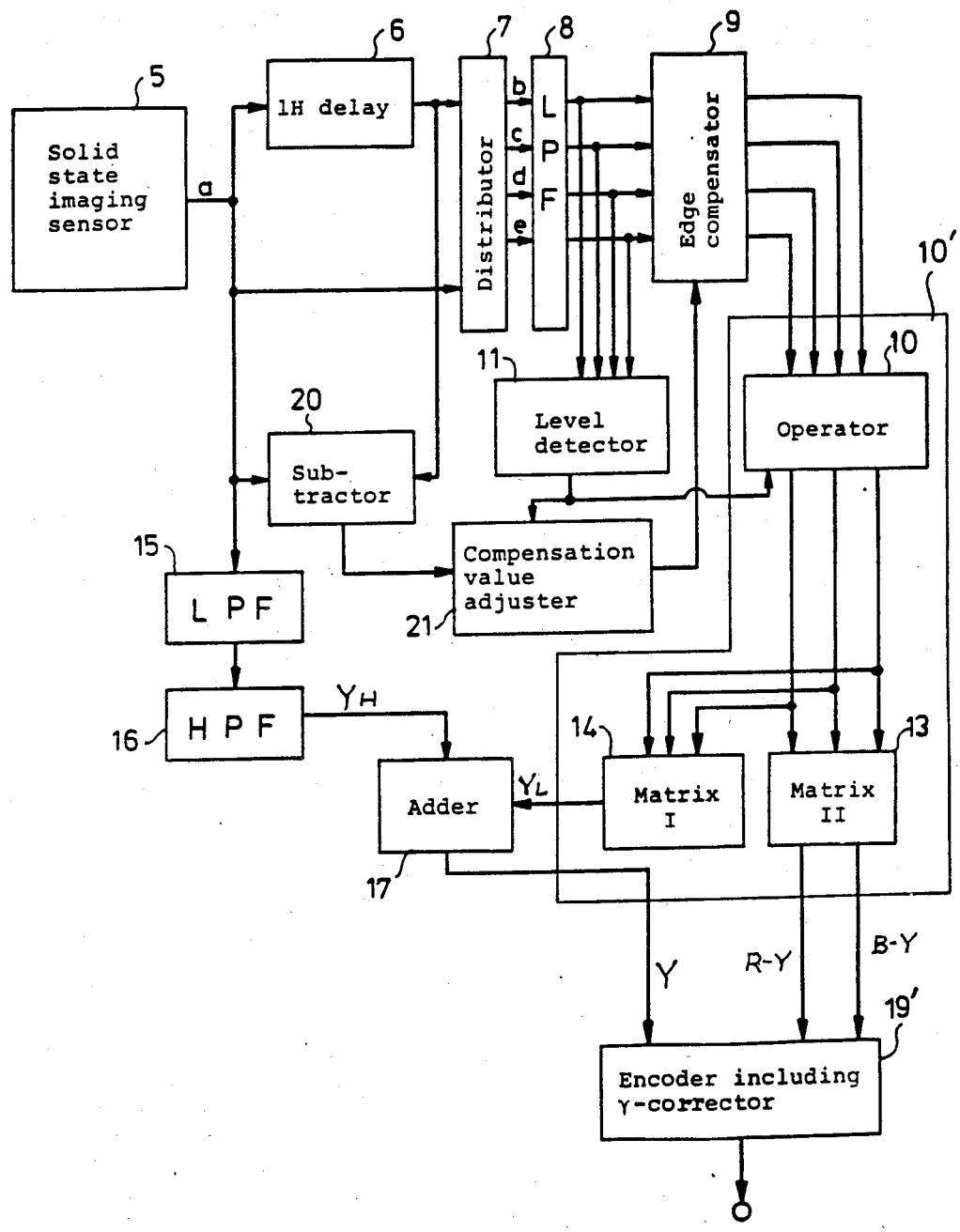
FIG. 6a is a block diagram showing a modified embodiment of the color solid imaging apparatus of the present invention.

FIG. 6a shows a modified embodiment, wherein a composite operator 10' comprises the operator 10 having a function corresponding to the operator 10 of FIG. 6, and further comprises Matrix I 14 and Matrix II 13, and the composite operator 10' issues chrominance signals to the encoder 19', which for example includes $\gamma$-corrector circuit therein. Other parts of FIG. 6a are identical to the corresponding parts of FIG. 6.

Although the above-mentioned explanation has been made on the color filter constitution of FIG. 3, the similar processings and circuitry can by realized not only with the monolithic solid state image sensor but also with assembled plural element for respective colors. Furthermore, as for the color combination and disposition of filter, other combination and disposition can be usable, and in such case, other order of color in extension signals for saturated picture element should be adopted.

The concept of the present invention is of course made into practice both in analog processing and digital processing of signals, though the analog processing should be taken care of cross-talks and lowering of processing speed. The digital processing is advantageous in easy embodying of the invention, and has been found to be much superior to the analog processing.

What is claimed is:

1. A solid state color imaging apparatus comprising:
a plurality of color filters of n different predetermined colors arranged in a predetermined manner;
a solid state imaging sensor for receiving light from an image through said color filters and producing therefrom n color signals having varying levels;
operation means for receiving said n color signals from said solid state imaging sensor and operating upon said signals for producing at least one of chrominance signals and a luminance signal either in a first mode such that said at least one of chrominance signals and a luminance signal are produced using all of said n color signals, or in a second mode in which said at least one of chrominance signals and a luminance signal are produced by using only n−1 of said n color signals wherein one of the n color signals is omitted because it has reached a predetermined saturation level; and
control means, responsive to said n color signals and connected to said operation means, for switching the mode of operation of said operation means from said first mode to said second mode when said control means determines that one of said n color signals has reached its predetermined saturation level.

2. A solid state color imaging apparatus comprising:
a plurality of color filters of n different predetermined colors arranged in a predetermined manner;
a solid state imaging sensor for receiving light from an image through said color filters and producing therefrom n color signals having varying levels;
operation means for receiving said n color signals from said solid state imaging sensor and for producing at least one of chrominance signals and a luminance signal, said operation means operating in a first signal processing mode by producing said at least one of chrominance signals and a luminance signal from said n color signals when none of said n color signals are saturated, and in a second signal processing mode by producing said at least one of chrominance signals and a luminance signal from n−1 unsaturated color signals of said n color signals and a compensating signal derived by said operation means from at least one of said n−1 unsaturated color signals when one of said n color signals is saturated; and
control means, responsive to said n color signals and connected to said operation means, for switching the mode of operation of said operation means from said first mode to said second mode when said control means determines that one of said n color signals is saturated.

3. A solid state color imaging apparatus as in claim 2 wherein said compensation signal is produced by multiplying said at least one of said n−1 unsaturated color signals by a predetermined constant, and said operation means utilizes said compensation signal, in place of said one saturated color signal, as well as all of said n−1 unsaturated color signals to produce said at least one of chrominance signals and a luminance signal when said operations means is operating in said second signal processing mode.

4. A solid state color imaging apparatus comprising:
a plurality of color filters of n different predetermined colors arranged in a predetermined manner;
a solid state imaging sensor for receiving light from an image through said color filters and producing therefrom n color signals having varying levels;
operation means for receiving said n color signals from said solid state imaging sensor and operating upon said signals to produce at least one of chrominance signals and a luminance signal, wherein said operation means has n signal processing modes including:
an nth signal processing mode for producing said at least one of chrominance signals and a luminance signal from said n color signals when all of said n color signals are unsaturated;
an (n−1)th signal processing mode for producing said at leat one of chrominance signals and a luminance signal from n−1 unsaturated color signals of said n color signals when one of said n color signals is saturated; and n−2 additional signal processing modes for producing said at least one of chrominance signals and a luminance signal from n−1 signals including all of said n color signals which are not saturated and compensation signals replacing all but one of said n color signals which are saturated, said compensation signals being derived by said operation means by multiplying at least one of said n color signals which are not saturated by predetermined constants; and control means, responsive to said n color signals and connected to said operations means, for switching the signal processing mode of said operation means in accordance with the successive saturation of the n color signals as determined by said control means.

* * * * *

UNITED STATES PATENT AND TRADEMARK OFFICE
CERTIFICATE OF CORRECTION

PATENT NO. : 4,680,623

DATED : July 14, 1987

INVENTOR(S) : Makoto Fujimoto, Yoshinori Kitamura, Atsushi Morimura and Hiroki Matsuoka It is certified that error appears in the above-identified patent and that said Letters Patent is hereby corrected as shown below:

Claim 2, line 13, after "from" insert -- all of -- and delete "when none of said";

line 14, delete "n color signals are saturated";

line 16, after "from" insert -- only --;

line 17, delete "unsaturated";

line 18, before "and" insert -- wherein one of the n color signals is omitted because it has reached a predetermined saturation level --;

line 20, delete "unsaturated" and "when one of said n color";

line 21, delete "signals is saturated"; and line 27, delete "is saturated" and insert therefor -- has reached its predetermined saturation level --.

Claim 3, line 6, delete "saturated" and after "signal" insert -- which has reached its predetermined saturation level --; and line 7, delete "unsaturated".

Signed and Sealed this

Seventeenth Day of May, 1988

Attest:

DONALD J. QUIGG

Attesting Officer

Commissioner of Patents and Trademarks